(12) United States Patent
Grimmett

(10) Patent No.: US 9,465,108 B1
(45) Date of Patent: Oct. 11, 2016

(54) SYSTEM AND METHOD FOR TARGET DOPPLER ESTIMATION AND RANGE BIAS COMPENSATION USING HIGH DUTY CYCLE LINEAR FREQUENCY MODULATED SIGNALS

(71) Applicant: The United States of America as represented by the Secretary of the Navy, Washington, DC (US)

(72) Inventor: Douglas J. Grimmett, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 208 days.

(21) Appl. No.: 14/559,685

(22) Filed: Dec. 3, 2014

(51) Int. Cl.
  *G01S 15/32* (2006.01)
  *G01S 7/536* (2006.01)
  *G01S 7/35* (2006.01)
  *G01S 13/32* (2006.01)

(52) U.S. Cl.
  CPC .............. *G01S 15/32* (2013.01); *G01S 7/354* (2013.01); *G01S 7/536* (2013.01); *G01S 13/32* (2013.01)

(58) Field of Classification Search
  CPC .......... G01S 15/32; G01S 7/536; G01S 7/35; G01S 13/32; G01S 7/354
  USPC ........................................................ 367/102
  See application file for complete search history.

(56) References Cited

U.S. PATENT DOCUMENTS

| | | | | | |
|---|---|---|---|---|---|
| 2,839,734 | A | * | 6/1958 | Hanley | ...................... G01S 1/72 342/201 |
| 3,005,335 | A | * | 10/1961 | Erdman | ............. G01N 29/0645 315/379 |

(Continued)

OTHER PUBLICATIONS

G. Hickman, J. Krolik, Non-recurrent wideband continuous active sonar, in proceedings IEEE Oceans 2012, Hampton Roads, VA, Oct. 2012.*
D. Grimmett, C. Wakayama, Multistatic Tracking for Continous Active Sonar using Doppler-Bearing Measurements, Proceedings of the 16th International Conference on Information Fusion, Jul. 2013, Istanbul, Turkey.*

(Continued)

*Primary Examiner* — Daniel Pihulic
(74) *Attorney, Agent, or Firm* — SPAWAR Systems Center Pacific; Kyle Eppele; Ryan J. Friedl

(57) ABSTRACT

A method involves using an echo-ranging system to transmit a continuously repeating linear frequency modulated (LFM) signal through a propagation medium and receive a return signal reflected off of a target, performing signal processing on the return signal for processing intervals shorter in duration than the return signal waveform cycle, extracting detected echo sets from the processing intervals, estimating a time versus delay slope for each of the detected echo sets, estimating a target range-rate using the estimated time versus delay slopes, computing a bias error using the estimated target range-rate, applying timing correction to the detected echo sets to remove the bias error, and using the echo ranging system to transmit the detected echo set to a target tracker system.

17 Claims, 6 Drawing Sheets

(56) References Cited

U.S. PATENT DOCUMENTS

| | | | | |
|---|---|---|---|---|
| 3,016,513 | A * | 1/1962 | Van Dyke | G01S 15/34 114/20.1 |
| 3,383,685 | A * | 5/1968 | Montana | G01S 13/003 342/131 |
| 3,798,590 | A * | 3/1974 | Jacobson | G01S 13/34 342/189 |
| 4,287,578 | A * | 9/1981 | Heyser | G01S 13/26 367/100 |
| 5,212,489 | A * | 5/1993 | Nelson | G01S 13/26 342/108 |
| 7,929,374 | B1 * | 4/2011 | Grimmett | G01S 7/003 367/98 |
| 8,675,448 | B1 * | 3/2014 | Wakayama | G01S 7/524 367/92 |
| 2011/0181456 | A1 * | 7/2011 | Luebbert | G01S 13/343 342/70 |

OTHER PUBLICATIONS

A. A. Winder, "11. Sonar System Technology", IEEE Trans. Sonics and Ultrasonics, vol. SU-22, No. 5, Sep. 1975.*

X. Song, P. Willet, S. Zhou, Posterior Cramer-Rao Bounds for Doppler biased Multistatic Range-only Tracking, in proceedings 14th International Conference on Information Fusion, Chicago, U.S.A., Jul. 2011.*

X. Song, P. Willet, S.Zhou, Range Bias Modeling for Hyperbolic-Frequency-Modulated Waveforms in Target Tracking, in IEEE Journal of Oceanic Engineering. vol. 37, No. 4, Oct. 2012.*

S. Coraluppi and D. Grimmett, Multistatic Sonar Tracking, in Proceedings of the SPIE Conference on Signal Processing, Sensor Fusion, and Target Recognition XII, Apr. 2003, Orlando FL, USA.*

A. A. Winder, "II. Sonar System Technology", IEEE Trans. Sonics and Ultrasonics, vol. SU-22, No. 5, Sep. 1975.

* cited by examiner

SYSTEM AND METHOD FOR TARGET DOPPLER ESTIMATION AND RANGE BIAS COMPENSATION USING HIGH DUTY CYCLE LINEAR FREQUENCY MODULATED SIGNALS

FEDERALLY SPONSORED RESEARCH AND DEVELOPMENT

The System and Method for Target Doppler Estimation and Range Bias Compensation Using High Duty Cycle Linear Frequency Modulated Signals is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 103245.

BACKGROUND

Continuous active sonar systems are used to continuously "listen" for target echoes during signal transmission. This capability allows for an increased number of detection opportunities and better target tracking and holding compared to a pulsed active sonar system, which listens after the transmission and must wait between successive transmissions. A linear frequency modulated (LFM) signal is one type of signal that may be used in continuous active sonar systems. While an LFM signal provides good target range information, it typically does not provide target range-rate information and is known to have a range-bias error that may restrict accurate target localization and tracking. A system and method are needed that use continuously repeating LFM signals, quickly estimate the target range-rate, and can ascertain and correct for the range bias error inherent to LFM signals.

DETAILED DESCRIPTION OF SOME EMBODIMENTS

Figure 1:
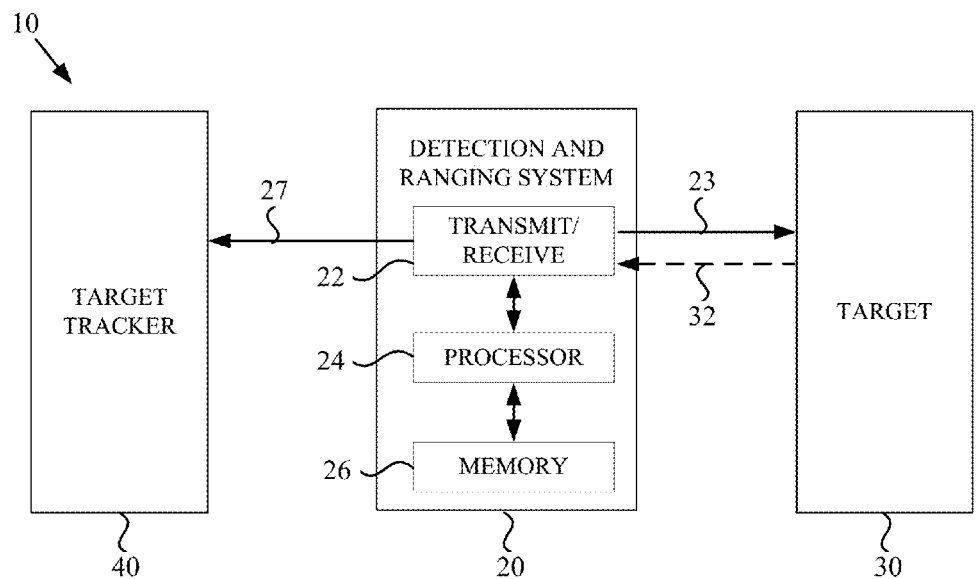
FIG. 1 shows a diagram illustrating an embodiment of a system in accordance with the System and Method for Target Doppler Estimation and Range Bias Compensation Using High Duty Cycle Linear Frequency Modulated Signals.

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

Unlike conventional Pulsed Active Sonar (PAS) which listens for echoes in between short-burst transmissions, High Duty Cycle (HDC) sonar attempts to detect echoes amidst the continual interference from source(s) transmitting with nearly 100% duty cycle. The potential advantage of HDC is an increased number of continuous detection opportunities, leading to improved target detection, localization, tracking, and classification. Continuous transmission waveforms may be of several types. One example is a linear frequency modulated waveform (LFM), which provides good range measurements, but not target Doppler. Another example is a continuous waveform (CW), which provides good Doppler measurements, but not target range.

The embodiments disclosed herein describe a system and method for Doppler estimation within a single cycle of a continuously repeating LFM HDC signal. Using the disclosed system and method, target Doppler can be estimated more quickly than the typical approach of estimating range-rate over multiple ping cycles. This approach is possible when the HDC LFM signals are processed over short time intervals, which provides a set of multiple measurements within each waveform cycle. The Doppler estimate is provided at the information processing stage and is available to a target tracker for improved target state estimation.

Additionally, the obtained Doppler estimates can be used to correct the measurements' range bias errors which are inherent in processing LFM signals. Bias errors are a more significant problem for HDC sonar than for PAS because of the reduction in transmitted bandwidth per unit time (frequency sweep rate). They may pose a particular problem in sensor fusion between multi-static sonar sensors by preventing data association (gating). These bias errors can be determined and compensated for using the estimated Doppler.

The potential advantage of HDC is an increased number of continuous detection opportunities, leading to improved target localization, tracking, and classification. With HDC sonar processing, the signal's bandwidth is spread out over the entire transmission repeat cycle. Splitting the full band up into sub-bands and by processing shorter time blocks, results in multiple detection opportunities per waveform cycle. Though the probability of detection and ranging accuracy may be lower for HDC sonar than for PAS (due to reductions in source level and processed bandwidth), a distinct advantage is that there is less time lapse between measurement scans. Such a rapid measurement update-rate effectively contains the growth of the target's area of uncertainty (AOU) within a kinematic tracker.

High data rate processing with HDC sonar may provide improved target localization, holding, and maneuver detection. In addition, it reduces the possibility of track degradation due to the possibility of updating the track with false alarms. Larger AOUs will have increased probability of false alarms falling within them and being erroneously associated with the target track. However, if breaking the processing down in smaller intervals causes target echo signal-to-noise ratios (SNRs) to reduce sufficiently that they are no longer detectable, then the target localization and tracking benefits discussed herein will not be realizable.

FIG. 1 shows a diagram illustrating an embodiment of a system 10 in accordance with the System and Method for Target Doppler Estimation and Range Bias Compensation Using High Duty Cycle Linear Frequency Modulated Signals. System 10 includes a detection and ranging system 20, a target 30, and a target tracker 40. As an example, detection and ranging system 20 is an echo-ranging system such as a radar or sonar. Detection and ranging system 20 is configured, such as via a transmitter, to transmit a signal 23 through a propagation medium to a target 30. As an example, the propagation medium may be the atmosphere or water.

Detection and ranging system 20 includes a transmitter-receiver pair 22. In some embodiments, the transmitter and receiver components of transmitter-receiver pair 22 are not physically located in the same location, but rather are separated via a wired or wireless connection and are configured to work together. As an example, a transmitter may be located on one vessel or floating object and a receiver on another vessel or floating object. In some embodiments, transmitter-receiver pair 22 comprises a general purpose transceiver device. Transmitter-receiver pair 22 is configured to transmit and receive ranging signals, such as pulsed and/or continuous LFM signals.

In some embodiments, such as embodiments where the transmitter and receiver are or are not located in the same location, transmitter-receiver pair 22 is operatively connected, such as via a wired or wireless connection, to a processor 24, which is operatively connected to a memory module 26. Processor 24 may be a general purpose processing device or a processing device specifically programmed to perform the embodiments of the method disclosed herein. Memory module 26, which may comprise any suitable commercially available memory device, is configured to store various types of data therein and may include computer-implementable instructions stored therein for performing the embodiments of the method, such as method 700, disclosed herein.

In some embodiments, signal 23 is a pulsed LFM signal. In some embodiments, signal 23 is a continuously repeating LFM signal, which may also be referred to in the art as a continuous time frequency modulated (CTFM) signal. An LFM signal is one in which the instantaneous frequency is "swept" linearly over time. The signals can be swept up ("up sweeps") or down ("down sweeps"). Other frequency modulated (FM) signals such as the hyperbolic frequency modulation (HFM) use non-linear relationships between the frequency and time and exhibit similar properties to the LFM, but with less sensitivity to Doppler. LFM signals are convenient for HDC operations because time delay is straightforwardly extracted from measurements of Doppler shift. The equation for an LFM signal is given by:

$$s_{FM}(t) = \sqrt{2/T} \cdot \cos\left[2\pi\left(f_1 t + k\frac{t^2}{2}\right)\right]; -\frac{T}{2} \leq t \leq \frac{T}{2}, \quad \text{(Eq. 1)}$$

where the waveform frequency-time slope (or sweep rate) is given by $$k = \frac{f_2 - f_1}{T}, \quad \text{(Eq. 2)}$$

where k is the waveform frequency-time slope (or sweep rate), T is the LFM signal duration, $f_1$ is the sweep start frequency, $f_2$ is the sweep stop frequency. An LFM signal's instantaneous frequency is "swept" linearly over time. It is the derivative of the signal's phase term, and is given by $$f = f_1 + kt. \quad \text{(Eq. 3)}$$

Other signals 23 that may be used include pulsed FM signals, pulsed or continuous waveform (CW) signals, and more advanced signals which attempt to capture the advantages of both FM and CW waveforms simultaneously. FM waveforms provide good target ranging measurements, but no Doppler information. Alternatively, CW waveforms provide good target Doppler (range-rate) measurements, but no ranging information. Systems, including multi-static systems, can gain valuable geometrically complementary detection opportunities when both signal types are used.

Additionally, sophisticated broadband waveforms, which attempt to provide both good range and Doppler measurements simultaneously, may be used. An HDC system which solely employs CW waveforms is unable to estimate target range, unless detections from multiple sensors (e.g., within multi-static configurations) are fused. These may be utilized for cross-fixing within a target tracker to obtain an unambiguous geographic localization. An HDC system which employs the FM waveform produces unambiguous target range measurements, and can infer Doppler (range-rate) information by processing multiple data segments within the cycle, as described herein.

Detection and ranging system 20 is further configured, such as via transmitter-receiver pair 22, to receive a return signal 32 from target 30. Return signal 32 represents the transmitted signal 23 reflected off of target 30. Detection and ranging system 20 is configured to process, return signal 32 according to the embodiments of method described herein.

In some embodiments, detection and ranging system 20 is configured to generate a signal 27 in response to processing return signal 32 and transmit signal 27 to a target tracker system 40, such as a kinematic target tracker, for tracking the position and/or velocity of target 30. Signal 27 may include various information including range-bias compensated time delay information for each detection measurement in the set of a cycle and range-rate information.

Detection and ranging system 20 may be configured with the appropriate software modules to perform the embodiments of the method, such as method 700, as discussed herein. As an example, processor 24 may have such modules stored therein, or, memory module 26 may have such modules stored therein, which are accessed by processor 24. The term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. The use of the term "module" herein, indicates reference to such software modules or implementations thereof.

Figure 2:
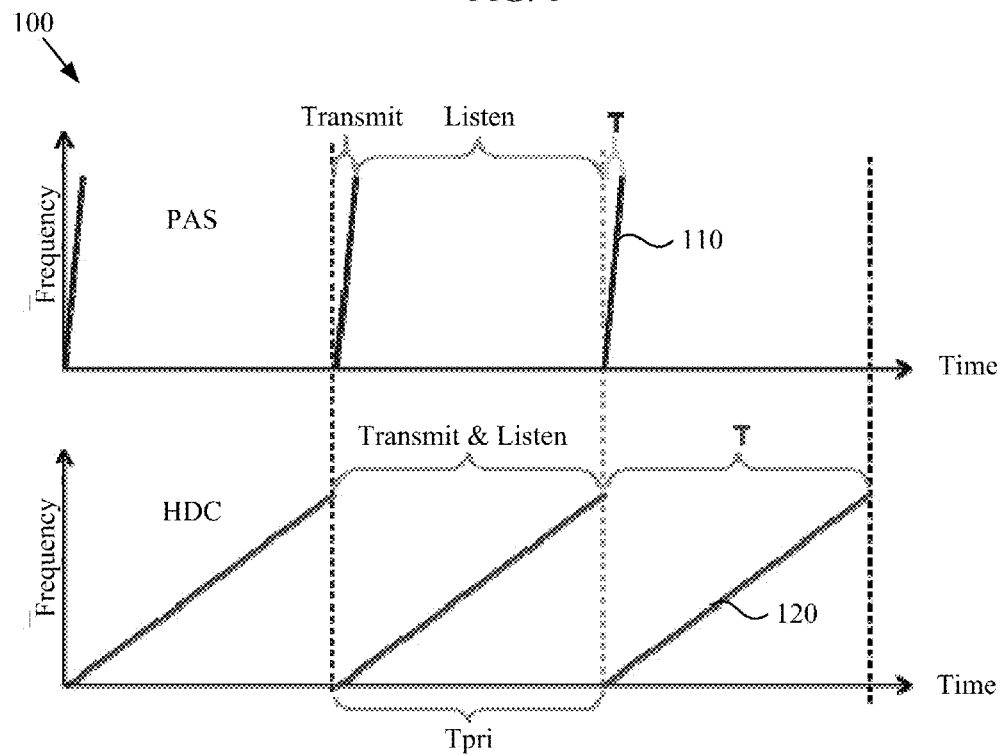
FIG. 2 shows a diagram illustrating the different approaches between high duty cycle sonar and pulsed active sonar.

FIG. 2 shows a diagram 100 illustrating the different approaches between HDC sonar and PAS. The top graph shows three PAS transmission cycles, where each transmission is shown by line 110. The bottom graph shows three HDC transmission cycles, where each transmission is shown by line 120. As shown, the HDC system listens while transmitting, whereas the PAS system listens after transmitting. Unlike a PAS system, HDC can provide multiple detection opportunities within a single FM ping repetition interval or cycle ($T_{pri}$) when processed appropriately. Less time lapse between detections allows near continuous holding on a target and constrains the growth of its AOU. This will improve target localization, holding, maneuver detection, and false track rate.

The disclosed embodiments use LFM HDC signals to quickly ascertain target range-rate as well as correct for range-bias errors which are inherent in LFM signal processing. Whereas PAS LFM signals often yield negligible bias errors, HDC LFM signals will have at least one order of magnitude larger bias errors than PAS signals due to reduced frequency sweep rate, when using equivalent bandwidth. This results in target mis-localization, which degrades target tracking and multi-sensor fusion. Further, systems using FM signals obtain target velocity estimates only through a multi-ping observation of the change in target range (range-rate). In PAS systems, the measurement update interval corresponds to the ping repetition interval, so range-rate estimation may take some time before it is obtained. With HDC LFM signals, the update rate is much quicker, with many potential target observations within a single $T_{pri}$ (intra-cyclical). The intra-cyclical observations can be used to estimate the range-rate in a much shorter time compared to a PAS system.

Figure 3:
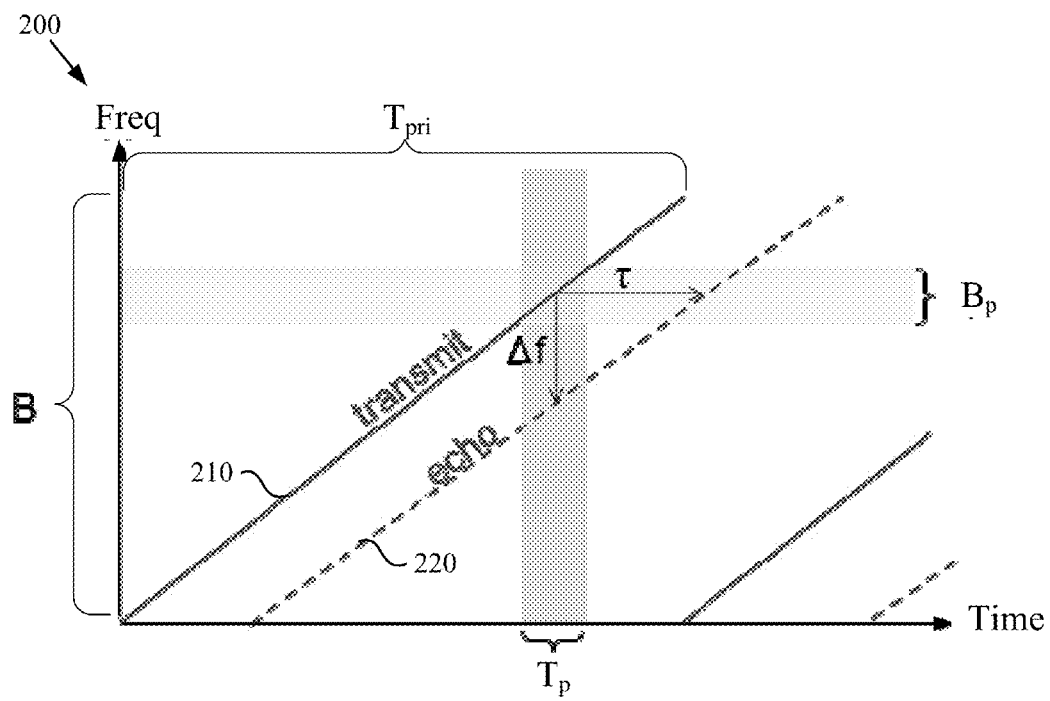
FIG. 3 shows a diagram illustrating the amplitude versus time for a transmitted linear frequency modulated (LFM) signal and a received return echo signal.

The use of continuous repeating LFM signals in HDC provides the ability to obtain range estimates of detected targets by measuring echo time delays. FIG. 3 shows a diagram 200 of an LFM waveform 210 with total bandwidth B and a duration T, which is the same as its ping repetition interval $T_{pri}$. An echo 220 from a target, such as target 30, arrives with time delay, $\Delta\tau$. As an example, the delay is obtained by heterodyning (de-chirping) the received signal and performing spectral processing. The delay is obtained from the frequency shift as $$\tau = \Delta f \cdot \frac{T_{pri}}{B}. \quad \text{(Eq. 4)}$$

The signal ambiguity function provides information about the sensitivity and accuracy of a waveform to target Doppler and delay time (which corresponds to range). The LFM signal's ambiguity function is given by $$|X_{FM}(f,\tau)|^2 = \left(1 - \frac{|\tau|}{T}\right)^2 \left\{\frac{\sin[\pi(f-k\tau)(T-|\tau|)]}{(\pi(f-k\tau))(T-|\tau|)}\right\}^2 \quad \text{(Eq. 5)}$$

where $\tau$ is the time delay, and $|\tau| \leq T$. When a target has Doppler, the processing will yield a bias error in the measured time delay.

The LFM measures time delay and is related to the time bias, which is a function of target Doppler as $$\tau_{measure} = \tau_{true} + \tau_{bias}; \tau_{bias} = \frac{2\dot{r}}{ck} \cdot f_c, \quad \text{(Eq. 6)}$$

where $\dot{r}$ is the target's range-rate (in knots), c is the speed of sound, $f_c$ is the waveform's (or processed waveform section's) center frequency, and where we ignore noise and estimate only the mean values. From this equation we see that the bias error worsens with increasing waveform operating frequency and target Doppler, and decreasing waveform frequency-time slope (i.e., lengthening T for fixed B or reducing B for fixed T).

Figure 4:
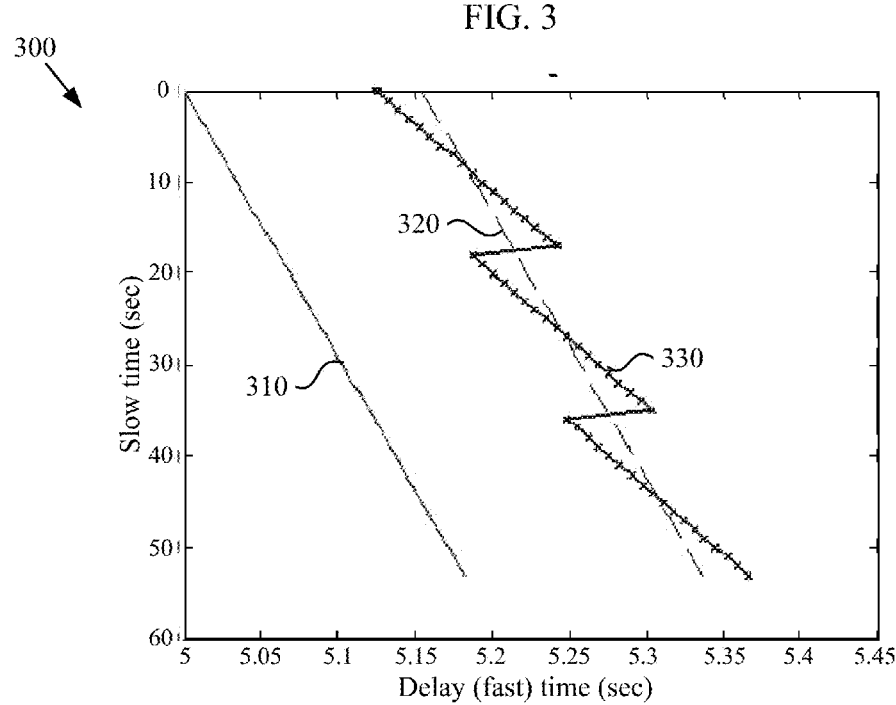
FIG. 4 shows a graph illustrating an example of the expected target time delay as a function of time for three cycles of an LFM waveform.

FIG. 4 shows a graph 300 illustrating the expected target time delay as a function of time, for three cycles of a continuous LFM waveform. The target in this example is assumed to be opening range at a speed of 5 knots. Line 310 represents the true target range-rate. Line 320 represents the expected measurements of time-delay when each LFM cycle is processed wholly and coherently as one single waveform. In this case the processing interval ($T_p$) is equal to $T_{pri}$, and bias error is observed to be constant over time (parallel to truth). However, if the processing is broken down into sub-sections, i.e., $T_p < T_{pri}$, then the resulting time delay has a "sawtooth" pattern which varies around the previous result. This is shown as line 330, where the signal is broken into 18 smaller processing intervals. This is due to the fact that each processing interval has a slightly different center frequency and thus an increased slope for the bias is obtained within each cycle. It is this sawtooth effect and the measurement of its slope vs. time delay within single HDC cycles that enables the Doppler estimation.

As noted above, HDC sonar signal processing may be done on smaller sub-sections (in time and frequency) of the full LFM waveform. This will provide more detection opportunities; however, they may be somewhat degraded compared to processing with the full LFM bandwidth. The impact of choosing less bandwidth to process is that it will yield less accurate detection echoes. The LFM range resolution is approximately given by $$\Delta r \approx \frac{c}{2B_p}, \quad \text{(Eq. 7)}$$

where c is the speed of sound in water and $B_p$ is the processed bandwidth. Processing smaller time-bandwidth segments at faster update rates will decrease resolution. The impact of this is two-fold. First, the decrease in resolution means more uncertainty in the target's localized position, compared to full band processing. Second, echo signal-to-background level may be reduced. Table 1 below shows an example comparison between the number of sub-bands, the processing time, processing bandwidth, and the total number of detection opportunities.

TABLE 1

| # of sub-bands N | Processing time $T_p$ (s) | Processing bandwidth $B_p$ (Hz) | # of detection opportunities |
|---|---|---|---|
| 1 | 18 | 900 | 50 |
| 2 | 9 | 450 | 100 |
| 6 | 3 | 150 | 300 |
| 18 | 1 | 50 | 900 |

The theoretical signal processing gain against background noise and background reverberation cases is given as $$PG_{noise} \sim 10^* \log_{10}(T_p) = 10^* \log_{10}(T/N), \quad \text{(Eq. 8)}$$

$$PG_{reverb} \sim 10^* \log_{10}(B_p) = 10^* \log_{10}(B/N), \quad \text{(Eq. 9)}$$

where N is the number of sub-bands the full waveform cycle is broken into for processing. Some sectors of the surveillance space will be limited by reverberation, while others will be limited by noise. Reductions in $T_p$ or $B_p$ will lead to larger observation cells. Within these larger cells, more noise or reverberation may enter and raise the acoustic background in the cell, which results in a loss in echo-to-background level. If the echo-to-background level drops below the detection threshold, the detection will be lost.

However, this assumes that the acoustic channel is completely coherent in time and frequency over the entire time and frequency band being processed. Many propagation channels, acoustic channels in particular, are subject to extreme time spreading and frequency spreading which destroys temporal and spectral coherence. If this is not the case, then processing larger time/frequency bands than those limits over which it is coherent will not provide increased gain. Knowing the time and frequency coherence limits will enable the system designer to make suitable choices for processing.

The Inter-Ping Slope (IPS) is defined as the slope of the target time-delay from one ping cycle to the next, as follows:

$$IPS = \frac{\Delta \tau}{\Delta t} = \frac{2 \cdot \Delta r / c}{T_{pri}} = \frac{2 \cdot \dot{r} \cdot T_{pri}}{c \cdot T_{pri}} = \frac{2\dot{r}}{c}. \quad \text{(Eq. 10)}$$

The Intra-Cyclical Slope (ICS) is defined as the slope of the target time-delay within a single ping cycle as:

$$ICS = \quad \text{(Eq. 11)}$$

$$\frac{\Delta \tau}{\Delta t} = IPS + \frac{\tau_{bias}(f_2) - \tau_{bias}(f_1)}{T_p} = IPS + \frac{\frac{2\dot{r}}{ck} \cdot (f_2 - f_1)}{T_p} = \frac{4\dot{r}}{c},$$

From these, it can be seen that with measurement of either IPS or ICS the target range-rate can be estimated according to $$\dot{r} = \frac{c \cdot IPS}{2} = \frac{c \cdot ICS}{4} \quad \text{(Eq. 12)}$$

Estimation based on IPS requires more time with multiple ping cycles processed (with resulting detections) and analyzed before the target Doppler can be obtained. Using ICS, the target range-rate may be estimated within a single transmission cycle, which is much quicker than what can be obtained using the IPS measurement. Further, if multiple measurements within a single cycle are treated as a batch, their bias errors can be compensated for prior to utilizing them in tracking and localization.

In some embodiments, the data will have undergone one or more steps of the following HDC processing chain: beam forming, de-chirp heterodyning, low-pass filtering, spectrogram processing, normalization, detection peak clustering and extraction (above some detection threshold). Range is related to time delay according to r=cτ/2. In some embodiments, the HDC processing uses a processing interval for the STFT which is short compared to the ping duration ($T_p < T_{pri}$), resulting in multiple detection opportunities, $N=T/T_p$, per waveform cycle. The processed detection contacts from one cycle are considered as batch measurements for which the ICS will be extracted. There may be multiple targets and fewer than N detections per target in each batch.

In some embodiments, the ICS is determined by means of the Hough transform, which is a common image processing method for detecting lines (and other) shapes within images. The Hough transform uses a parameter space representation of a line using the polar form as $$\rho = \tau \cdot \cos \theta + t \cdot \sin \theta, \quad \text{(Eq. 13)}$$

where t and T represent quantities of (slow) ping time and delay time, respectively. Using such a representation, input image lines map to single points. Each point in the input image (τ, t), is thus mapped into an accumulator array in the (ρ, θ) parameter space, with each pixel containing the count of input points contributing to it. A threshold is then set on the output accumulator array requiring M out of N detection counts; otherwise the detection cluster is removed from further processing. Where the M of N rule is satisfied, the peaks of the Hough output image in (ρ, θ) are extracted, and treated as detected lines. These can then be converted to slope-intercept form to obtain the ICS.

In some embodiments, a measurement of ICS is made for each set of contacts. The target Doppler may then be obtained using (Eq. 12). This range-rate estimate is the best linear fit of the target's motion over the current cycle being processed. The cycle time is presumed short enough that targets can reasonably be assumed to be traveling according to a nearly constant velocity (NCV) motion model. The resulting target Doppler is now associated with all the contacts which contributed to its estimation and may be utilized to characterize or classify the detection group. In some embodiments, the resulting target range-rate estimate may also be incorporated as additional useful information into a subsequent target tracking process.

Once the target Doppler has been estimated, the time/range bias errors can be corrected. This is done by reforming (Eq. 6) as follows $$\tau_{compensated}(t) = \tau_{measured}(t) - 2\dot{r}/ck \cdot f_c(t) \quad \text{(Eq. 14)}$$

Here, it must take into account that $f_c(t)$ steps up or down with each successive processing interval in time according to the LFM sweep. All detections within each ping cycle are individually compensated for their range biases. The output of this process will remove both the effect of the constant bias offset and the "saw tooth" effect. The resulting contact information is more accurate and sent to a target tracker without biases.

Further, with HDC LFM processing, there is freedom to select the processing time/bandwidth. Reducing the processing bandwidth will decrease the range resolution, which increases the AOU of and target echo. It may also potentially reduce target echo signal-to-noise ratio. At the same time, it will provide increased number of detection opportunities per waveform cycle, with less time lapse from scan-to-scan. This will contain the growth rate of the target AOU. There will be a tradeoff between achieving reductions in AOU growth rate and detection resolution which should be considered.

With regard to AOU growth, the target state vector at time $t_k$, is given by the mean x and y positions and velocities as $$X_k = [x_k y_k \dot{x}_k \dot{y}_k]^T. \quad \text{(Eq. 15)}$$

Some uncertainty is presumed in the estimate, which is captured by the target state covariance matrix $$P_k = \begin{bmatrix} \sigma_x^2 & \sigma_{xy} & \sigma_{x\dot{x}} & \sigma_{x\dot{y}} \\ \sigma_{xy} & \sigma_y^2 & \sigma_{\dot{x}y} & \sigma_{y\dot{y}} \\ \sigma_{x\dot{x}} & \sigma_{\dot{x}y} & \sigma_{\dot{x}}^2 & \sigma_{\dot{x}\dot{y}} \\ \sigma_{x\dot{y}} & \sigma_{y\dot{y}} & \sigma_{\dot{x}\dot{y}} & \sigma_{\dot{y}}^2 \end{bmatrix}. \quad \text{(Eq. 16)}$$

The target positional error covariance and the target velocity error covariance are given by sub matrix of $P_k$ as $$P_{pos} = \begin{bmatrix} \sigma_x^2 & \sigma_{xy} \\ \sigma_{xy} & \sigma_y^2 \end{bmatrix}; P_{vel} = \begin{bmatrix} \sigma_{\dot{x}}^2 & \sigma_{\dot{x}\dot{y}} \\ \sigma_{\dot{x}\dot{y}} & \sigma_{\dot{y}}^2 \end{bmatrix}. \quad \text{(Eq. 17)}$$

The positional AOU is then defined as $$AOU_{pos} = -2\pi \ln(1-p)\sqrt{|P_{pos}|}. \quad \text{(Eq. 18)}$$

The velocity AOU is then defined as $$AOU_{vel} = -2\pi \ln(1-p)\sqrt{|P_{vel}|}. \quad \text{(Eq. 19)}$$

where p is the desired probability of the target being inside the covariance ellipse. Until another measurement can be obtained and successfully associated with the current estimate, the target state and its uncertainty is projected forward to a future time, $t_{k+1}$, according to the NCV target motion model as $$X_{k+1} = \Phi_k X_k + w_k, \quad \text{(Eq. 20)}$$

$$P_{k+1} = \Phi_k X_k \Phi_k^T + Q_k, \quad \text{(Eq. 21)}$$

where $\Phi_k$ is the state transition matrix given by $$\Phi_k = \begin{bmatrix} 1 & 0 & \Delta t_k & 0 \\ 0 & 1 & 0 & \Delta t_k \\ 1 & 0 & 1 & 0 \\ 0 & 1 & 0 & 1 \end{bmatrix}, \quad \text{(Eq. 22)}$$

$$\Delta t_k = t_{k+1} - t_k, \quad \text{(Eq. 23)}$$

where $w_k$ is modeled as a zero-mean white Gaussian process as $w_k \sim N(0, Q_k)$, where $Q_k$ represents the process noise given by $$Q_k = \begin{bmatrix} \frac{1}{3}q_x(\Delta t_k)^3 & 0 & \frac{1}{2}q_x(\Delta t_k)^2 & 0 \\ 0 & \frac{1}{3}q_y(\Delta t_k)^3 & 0 & \frac{1}{2}q_y(\Delta t_k)^2 \\ \frac{1}{2}q_x(\Delta t_k)^2 & 0 & q_x \Delta t_k & 0 \\ 0 & \frac{1}{2}q_y(\Delta t_k)^2 & 0 & q_y \Delta t_k \end{bmatrix}, \quad \text{(Eq. 24)}$$

where $q_x$ and $q_y$ represent process noise parameters in x and y coordinates, and which account for target maneuvers.

The process noise parameters can be increased to model a highly maneuverable target. For targets that are not highly evasive and whose motion does not depend significantly on the environment, the NCV model is adequate. As the time between measurement scans, $\Delta t_k$, increases the process noise term increases, and the localization uncertainty increases. HDC processing enables a much quicker update rate, reducing $\Delta t_k$, thereby minimizing the growth of the AOU in both position and velocity. Although focus is on the positional AOU, there will be an equivalent benefit in the velocity estimation as well. As the measurement update rate increases, the growth rate of the uncertainty in target velocity will also be contained.

In addition to minimizing the growth of the AOU, the method allows to obtain an estimate of the target range-rate and an ability to correct for the range biases in the measurement prior to tracking. The kinematic tracking equations previously discussed allow for random measurement uncertainty. However, these equations do not accommodate or handle range bias errors, which may significantly degrade target tracker performance. This method prepares bias-free data for input to the kinematic tracker. This is particular important for information fusion algorithms which must perform cross sensor data association, and which can be severely degraded when measurements contain bias error.

Figure 5:
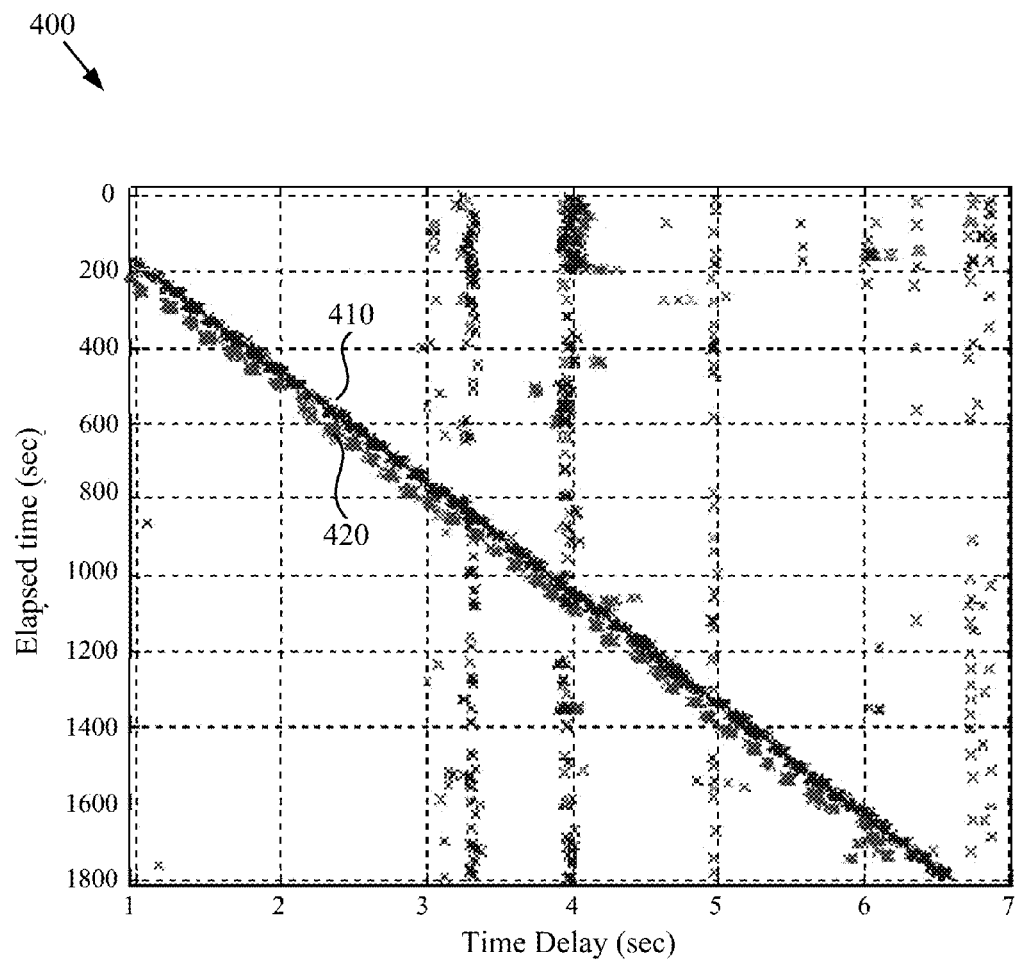
FIG. 5 shows a graph illustrating detection contacts achieved using the System and Method for Target Doppler Estimation and Range Bias Compensation Using High Duty Cycle Linear Frequency Modulated Signals.

FIG. 5 shows a graph 400 of the results of the application of the bias correction algorithm to measured sample data. The data was heterodyned (de-chirped) using the known transmission signal, and low pass filtered. Spectrogram processing was then performed with an FFT integration time ($T_p$) of 1 second. With this processing, about eighteen detection opportunities were expected on every other ping transmission cycle. The data was then normalized and detection contacts were formed. The detection contacts were sent to the Doppler estimation and range-bias correction algorithm in blocks of twenty scans at a time, (corresponding to $T_{pri}$).

Line 410 and the majority of the surrounding points represent all of the input detection contacts. For this data, the target is observed opening in range from time delays of 1.0 to 6.5 seconds. Also present, are various fixed clutter features, though they appear to have fewer detections and less scan-to-scan consistency. Line 420 represents the output of the algorithm, which are the detection contacts with bias correction for all groups which passed the M/N test.

Figure 6:
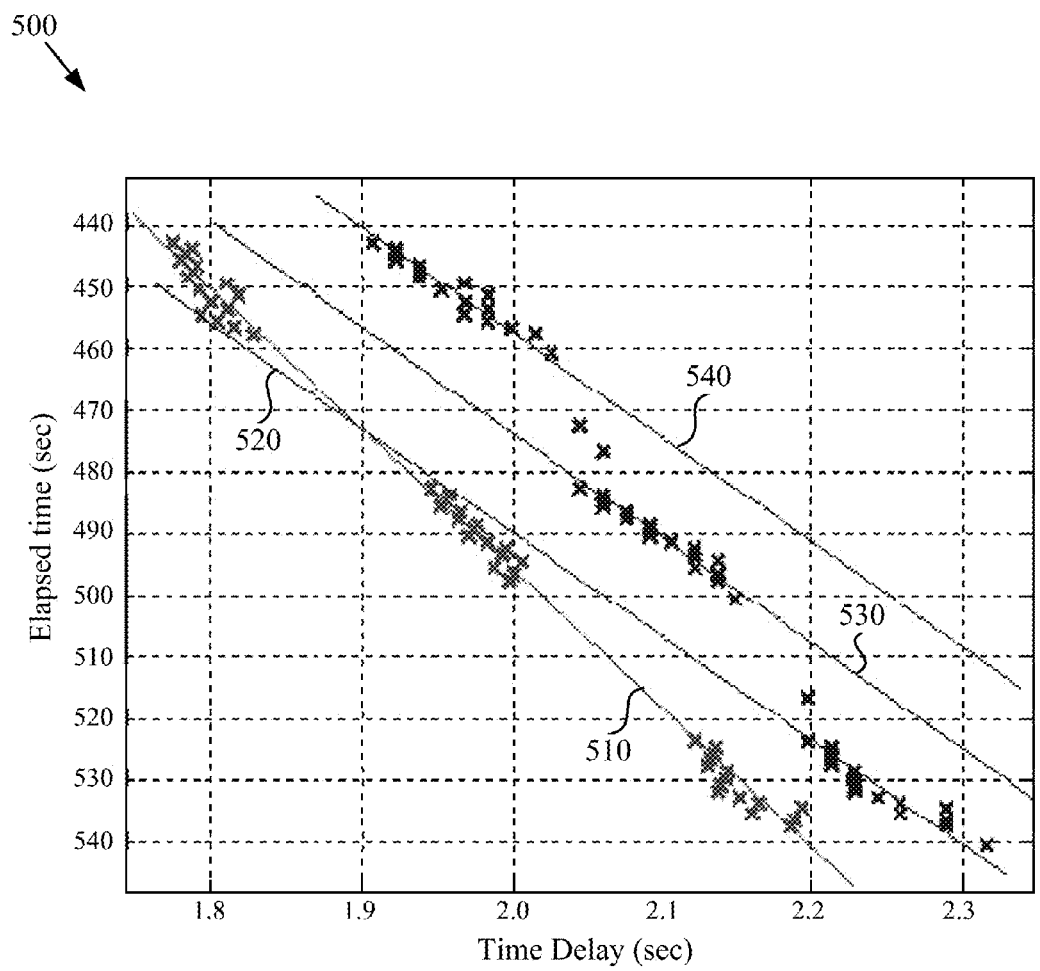
FIG. 6 shows a graph illustrating a section of output over five transmission cycles using the System and Method for Target Doppler Estimation and Range Bias Compensation Using High Duty Cycle Linear Frequency Modulated Signals.

FIG. 6 shows a graph 500 illustrating a detailed view of a section of the output over five cycles of transmission. The bias corrected output is represented by line 510 and the points associated with line 510. The biased input data for every other cycle is shown, represented by lines 520, 530, and 540, with each having a number of associated detections. Lines 510, 520, 530, and 540 are overlaid over the detections to help visualize the slope of each group relative to the others. The Doppler compensated contacts are shown with smaller time delays (i.e., ranges) than the uncompensated detections. The input detection groups, shown on lines 520, 530, and 540, have the same slope, but don't fall on the same line as they exhibit the saw tooth pattern. For the output points on line 510, the slopes of the individual groups are consistent with the slope from group-to-group. The saw tooth pattern has effectively been removed, and the range-bias appropriately corrected.

Figure 7:
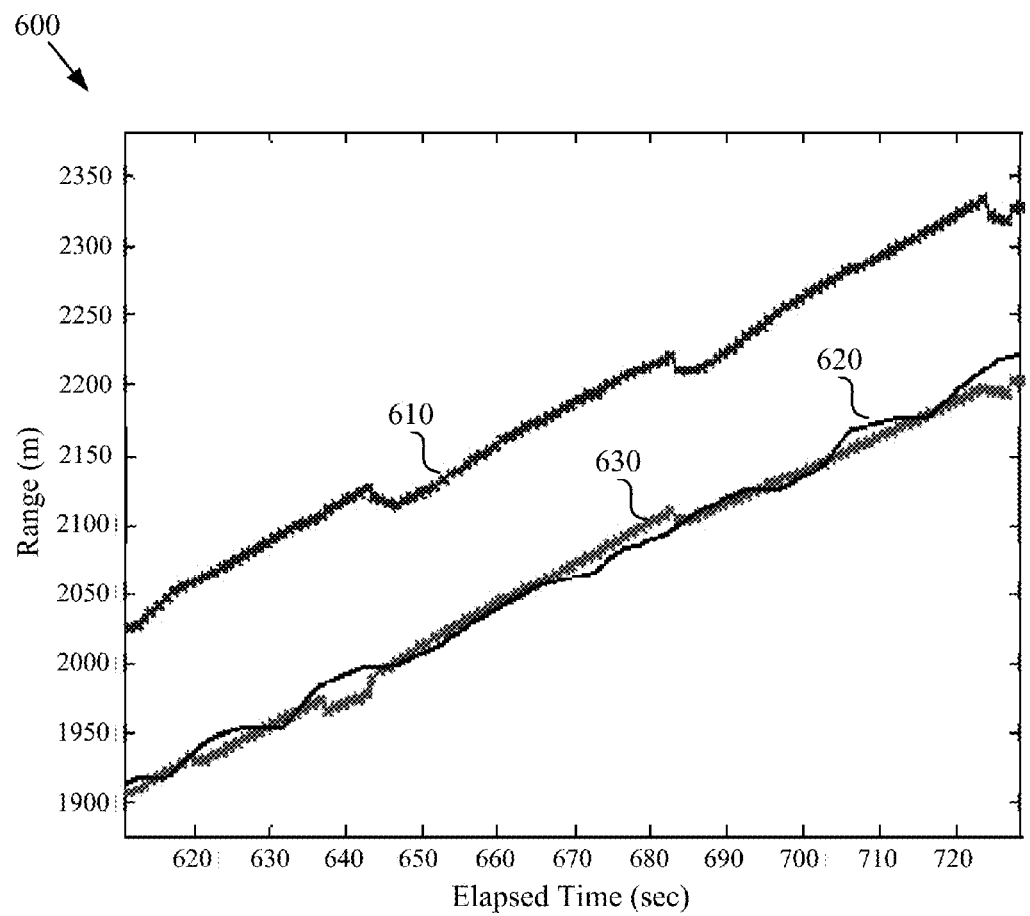
FIG. 7 shows a graph illustrating estimates of a target range produced using the System and Method for Target Doppler Estimation and Range Bias Compensation Using High Duty Cycle Linear Frequency Modulated Signals.

In some embodiments, the data may be input into a target tracker, such as a multi-sensor, multi-target tracker. Tracker results were obtained for both the input (uncompensated) data and the output (compensated data). FIG. 7 shows a graph 600 illustrating estimates of a target range produced using the System and Method for Target Doppler Estimation and Range Bias Compensation Using High Duty Cycle Linear Frequency Modulated Signals. FIG. 7 shows the results for segment of the scenario with the true target range overlaid. The uncompensated track, shown as line 610, is seen offset from the true track, shown as line 620, due bias errors and includes some jitter due to the "saw tooth" effect. The compensated track, shown as line 630, shows better localization accuracy and a smoother trajectory estimate.

Figure 8:
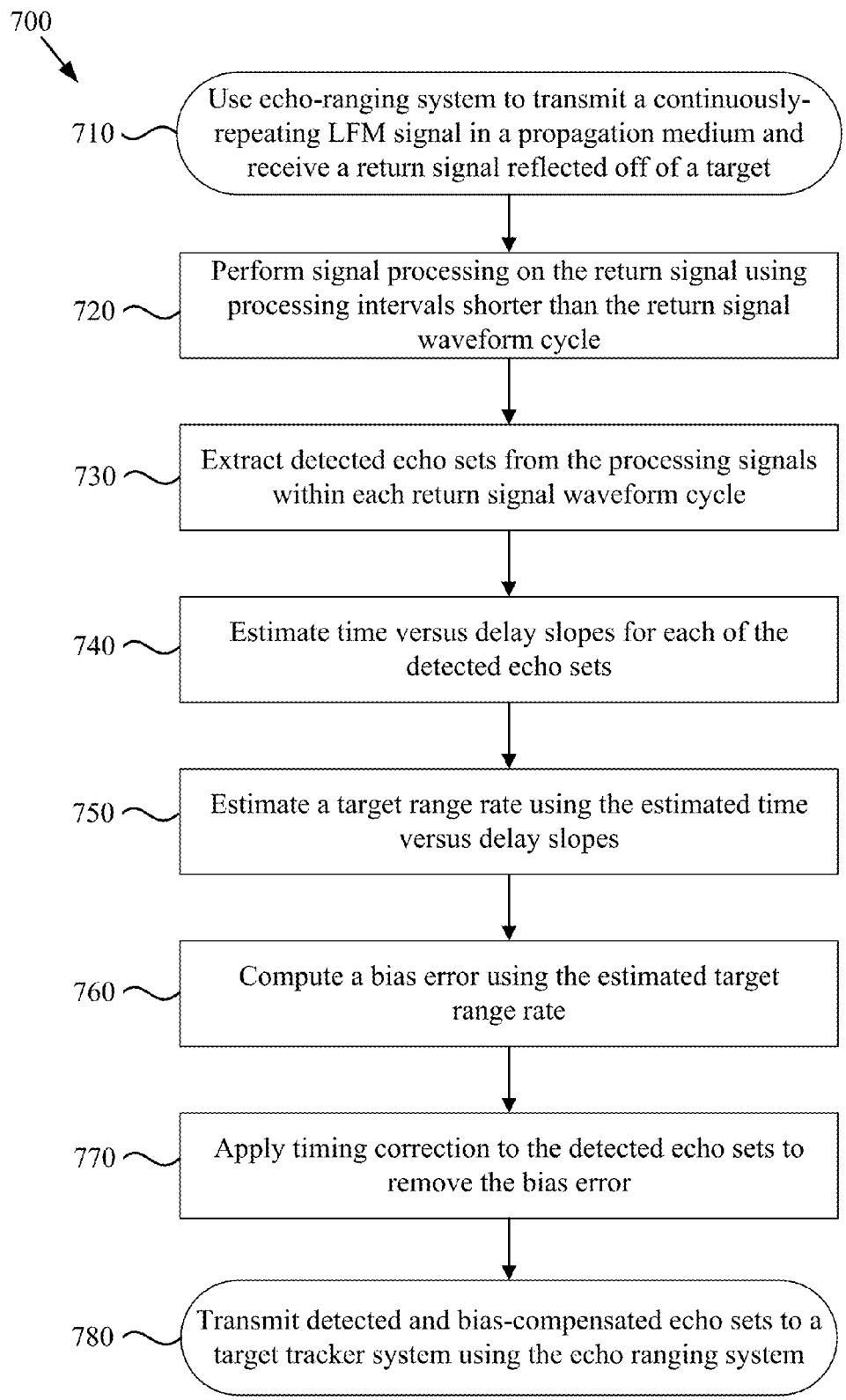
FIG. 8 shows a flowchart of an embodiment of a method in accordance with the System and Method for Target Doppler Estimation and Range Bias Compensation Using High Duty Cycle Linear Frequency Modulated Signals.

FIG. 8 shows a flowchart of an embodiment of a method 700 in accordance with the System and Method for Target Doppler Estimation and Range Bias Compensation Using High Duty Cycle Linear Frequency Modulated Signals. Method 700 disclosed herein may be implemented as a series of modules, either functioning alone or in concert with physical electronic and computer hardware devices. Such modules may be utilized separately and/or together locally and/or remotely to form a program product thereof, that may be implemented through recordable media. Method 700 may be implemented as a program product comprised of a plurality of such modules.

Some or all of the steps of method 700 may be stored on a non-transitory computer readable storage medium, wherein the steps are represented by computer-readable programming code. The steps of method 700 may also be computer-implemented using a programmable device, such as a computer-based system. Method 700 may comprise instructions that, when loaded into a computer-based system, cause the system to execute the steps of method 700. Method 700 may be computer-implemented using various programming languages, such as "Java", "C", or "C++". In some embodiments, method 700 may be implemented via an FPGA device. Further, method 700 may be implemented within a system such as system 10 shown in FIG. 1.

For illustrative purposes, method 700 will be discussed with reference to the steps being performed by detection and ranging system 20, using instructions stored within processor 24 or within memory module 26. Additionally, while FIG. 8 shows one embodiment of method 700 to include steps 710-780, other embodiments of method 700 may contain fewer or more steps. Further, while in some embodiments the steps of method 700 may be performed as shown in FIG. 8, in other embodiments the steps may be performed in a different order, or certain steps may occur simultaneously with one or more other steps.

Method 700 begins at step 710, which involves using an echo-ranging system, such as detection and ranging system 20, to transmit, via transmitter-receiver pair 22, a continuously repeating LFM signal 23 through a propagation medium and receive a return signal 32 comprising the transmitted LFM signal reflected off of a target, such as target 30, in the propagation medium. Step 720 involves selecting a processing interval that is shorter than a return signal waveform cycle and performing signal processing, using processor 24, on the return signal for each of the processing intervals. In some embodiments, the signal processing comprises at least one of beam forming, heterodyning, spectral processing, low-pass filtering, normalization, and detection peak clustering.

Step 730 involves extracting, via processor 24, detected echo sets from the processing intervals within each return signal waveform cycle. Step 740 involves estimating, via processor 24, a time versus delay slope for each of the detected echo sets. In some embodiments, the step of estimating a target range-rate using the estimated time versus delay slopes for each of the detected echo sets comprises determining a best linear fit of the estimated time versus delay slopes. As an example, in some embodiments, the time versus delay slope of the echo set is estimated using a Hough transform. In some embodiments, the time versus delay slope is the slope of the target time delay within a single ping cycle, while in other embodiments, the time versus delay slope is the slope of the target time delay from one ping cycle to the next ping cycle.

Step 750 involves estimating, via processor 24, a target range-rate using the estimated time versus delay slopes for each of the detected echo sets. In some embodiments, step 750 is performed using (Eq. 12) shown above. Step 760 involves computing, via processor 24, a bias error using the estimated target range-rate. Step 770 involves applying, via processor 24, timing correction to the detected echo sets to remove the bias error. In some embodiments, steps 760 and 770 are performed using (Eq. 14) shown above.

In some embodiments, method 700 concludes after step 770, while in other embodiments, method 700 proceeds to step 780. Step 780 involves using the echo ranging system, particularly the transmitter of transmitter-receiver pair 22, to transmit a signal 27 including information about the detected echo set to a target tracker system, such as target tracker 40. As an example, the information transmitted may be range-bias compensated time delays for each detection measurement in the set (of a cycle). Also, information transmitted may include the range-rate information itself, for each measurement of the set to potentially be utilized by the kinematic tracker. Target tracker 40 may use the provided information to track the position and/or velocity of target 30.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the System and Method for Target Doppler Estimation and Range Bias Compensation Using High Duty Cycle Linear Frequency Modulated Signals are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A method comprising the steps of:
    using an echo-ranging system, transmitting a continuously repeating linear frequency modulated (LFM) signal through a propagation medium and receiving a return signal comprising the transmitted LFM signal reflected off of a target in the propagation medium;
    selecting a processing interval that is shorter than a return signal waveform cycle and perform signal processing on the return signal for each of the processing intervals;
    extracting detected echo sets from the processing intervals within each return signal waveform cycle;
    estimating a time versus delay slope for each of the detected echo sets;
    estimating a target range-rate using the estimated time versus delay slope for each of the detected echo sets;
    computing a bias error using the estimated target range-rate; and
    applying timing correction to the detected echo sets to remove the bias error.

2. The method of claim 1, wherein the signal processing comprises at least one of beam forming, heterodyning, spectral processing, low-pass filtering, normalization, detection peak clustering, and extraction.

3. The method of claim 1, wherein the time versus delay slope of the echo set is estimated using a Hough transform.

4. The method of claim 1, wherein the time versus delay slope is the slope of the target time delay within a single ping cycle.

5. The method of claim 1, wherein the step of estimating a target range-rate using the estimated time versus delay slopes for each of the detected echo sets comprises determining a best linear fit of the estimated time versus delay slopes.

6. The method of claim 1, wherein the echo-ranging system is a sonar system.

7. The method of claim 1, wherein the echo-ranging system is a radar system.

8. The method of claim 1 further comprising the step of using the echo ranging system to transmit the range-bias compensated detected echo set and range-rate estimates per detected echo in the set to a target tracker system.

9. A system comprising:
    an echo-ranging system comprising a processor operatively connected to a transmitter-receiver pair and a memory module, the processor configured, via programming instructions accessible thereto, to perform the steps of:
    transmitting, via a transmitter of the transmitter-receiver pair, a continuously repeating linear frequency modulated (LFM) signal through a propagation medium and receiving, via a receiver of the transmitter-receiver pair, a return signal and its echoes, the return signal comprising the transmitted LFM signal reflected off of a target in the propagation medium;
    selecting a processing interval that is shorter than a return signal waveform cycle and performing signal processing on the return signal for each of the processing intervals;
    extracting detected echo sets from the processing intervals within each return signal waveform cycle;
    estimating a time versus delay slope for each of the detected echo sets;
    estimating a target range-rate using the estimated time versus delay slope for each of the detected echo sets;
    computing a bias error using the estimated target range-rate; and
    applying timing correction to the detected echo sets to remove the bias error.

10. The system of claim 9, wherein the signal processing comprises at least one of beam forming, heterodyning, spectral processing, low-pass filtering, normalization, detection peak clustering, and extraction.

11. The system of claim 9, wherein the processor is configured to estimate the time versus delay slope of the echo set using a Hough transform.

12. The system of claim 9, wherein the time versus delay slope is the slope of the target time delay within a single ping cycle.

13. The system of claim 9, wherein the time versus delay slope is the slope of the target time delay from one ping cycle to the next ping cycle.

14. The system of claim 9, wherein the processor is configured to estimate a target range-rate using the estimated time versus delay slopes for each of the detected echo sets by determining a best linear fit of the estimated time versus delay slopes.

15. The system of claim 9, wherein the echo-ranging system is a sonar system.

16. The system of claim 9, wherein the echo-ranging system is a radar system.

17. The system of claim 9, wherein the processor is further configured, via programming instructions accessible thereto, to perform the step of transmitting, via the transmitter, the range-bias compensated detected echo set and range-rate estimates per detected echo in the set to a target tracker system operatively connected to the echo-ranging system.

* * * * *